(12) United States Patent
Pritt

(10) Patent No.: US 6,532,311 B1
(45) Date of Patent: Mar. 11, 2003

(54) IMAGE BROWSER

(75) Inventor: Mark D. Pritt, Walkersville, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/258,395

(22) Filed: Feb. 26, 1999

(51) Int. Cl.[7] .................................................. G06K 9/20
(52) U.S. Cl. ........................ 382/282; 382/305; 358/403
(58) Field of Search .................................. 382/282, 305, 382/306, 255; 358/403, 433; 345/530, 531, 544

(56) References Cited

U.S. PATENT DOCUMENTS

| | | |
|---|---|---|
| 5,307,452 A | 4/1994 | Hahn et al. |
| 5,426,513 A * | 6/1995 | Scorse et al. ............... 358/433 |
| 5,546,473 A | 8/1996 | Buytaert et al. |
| 5,673,376 A | 9/1997 | Ray et al. |
| 5,689,343 A | 11/1997 | Loce et al. |
| 5,715,384 A | 2/1998 | Ohshima et al. |
| 5,781,196 A | 7/1998 | Streater |
| 5,790,708 A | 8/1998 | Delean |

* cited by examiner

Primary Examiner—Thomas D. Lee
(74) Attorney, Agent, or Firm—Richard L. Aitken; Venable

(57) ABSTRACT

In an image browser for browsing a deck of hyperspectral images, the images of the deck are divided into square blocks each containing 25 pixels. The images are browsed by selecting foci of attention in selected images in sequence. Each time a focus of attention is selected, the image block containing that focus of attention is read out and displayed. Then if no new focus of attention has been selected by moving the focus of attention in the selected image or by changing the selected image, the image blocks surrounding the focus of attention in the selected image are read out and displayed in a spiral pattern until a new focus of attention is selected whereupon the process of read out and display starts again from the new focus of attention.

24 Claims, 2 Drawing Sheets

IMAGE BROWSER

This invention relates to accessing images for display and, more particularly, to an improved system for displaying images from a stored deck of related images.

BACKGROUND OF THE INVENTION

This invention is particularly applicable to hyperspectral imaging, which is a system that combines the spatial presentation of images with the analytical capability of a spectrometer. More specifically, a hyperspectral image sensor senses and stores images of a scene wherein each stored image of the scene is confined to a narrow wavelength band of a selected spectrum, i.e., the visible spectrum or the infrared spectrum. The narrow wave bands of the images are selected to cover the entire range of the selected spectrum and several hundred images of a given scene, each at a different narrow wavelength band will be stored. The images are stored in a pixel form and amount to a huge amount of stored data. For example, the AVIRIS (airborne visible/infrared imaging spectrometer) stores 224 spectral brands with each scene being stored in a pixel frame of 612×512 pixels. To store this deck of images, 140 megabytes of data capacity is required. The double segment images used by the U.S. Geological Survey require a capacity of 300 megabytes.

In a typical computer used to display the images, the image data will not all fit in the memory RAM and must be stored on the computer's hard disk, The reading of the stored images from the hard disk is slow and, as a result, a viewer of the images cannot effectively browse through the image data. After selecting a stored image to be retrieved from the disk and viewed, the user must wait several seconds before the selected image is reproduced on the computer monitor. The delay between the presentation of successive images to be viewed makes browsing through the image data awkward and impractical. What is needed is a capability to flip through the images rapidly without delay so that the images can be viewed in the manner of flipping through cards of a deck or through pages of a magazine.

Prior to the present invention, the problem of accessing large amounts of image data involved compressing the data or otherwise reducing its resolution to enable reduced resolution images to be accessed more quickly from the disk. One such system allows the user to load smaller reduced resolution images onto the memory and then to interactively browse through the smaller images. However, the smaller images are not much larger than postage stamps and the user gets only an overview of the images and cannot examine detailed features. Other techniques for dealing with large numbers of images compress the image data. These techniques are not satisfactory because the image compression also induces the loss of image detail. The users who are analyzing hyperspectral images usually need to examine detailed features of the images and this need is frustrated by the prior art techniques of accessing image data rapidly. None of the systems presently in use can effectively browse interactively through an entire spectral data set or other types of image data at full image resolutions.

SUMMARY OF THE INVENTION

The system of the invention enables the user to browse through an entire full resolution data set representing a hyperspectral deck of images, or any data set consisting of a large sequence of related images, in an interactive manner. The invention permits the browsing without compressing the images or otherwise reducing their resolution and places no limitation on the size and number of the images which can be browsed.

The system of the invention is based on a principle of human perception called "focus of attention" (FOA). In accordance with the FOA principle of perception, a person looking at an image tends to focus his attention on one portion of the image and then shift to another portion. The viewer of the image does not study the entire image simultaneously. Instead, the viewer focuses his attention on small portions of the image at a given instant of time and then jumps his gaze periodically from one portion of the image to another. FIG. 1 illustrates how the FOA of a human subject moves around an image being viewed. The black line on the image of a wine glass on a table shows where the attention of the human subject wandered as he viewed the image. The clumps in the black line show where the human subject paused and focused his attention on interesting details of the image. The present invention, by exploiting the principle of FOA, is able to get around the limitations inherent in attempting to browse a huge amount of image data of hyperspectral image decks or other image decks of related images.

In accordance with the invention, each stored image of the hyperspectral deck is divided into small blocks, or image sections, each of which can be individually read from the disk and displayed on the screen very quickly. The user selects an image from the deck and then, using the mouse, the user selects any point in the selected image to be the FOA. The block of the selected image containing the FOA is then read from the disk and displayed on the screen. The readout and display only takes a fraction of a second. After completion of the readout and display of the block containing the FOA, if the user hasn't changed the FOA or the selected image, the neighboring image blocks in the selected image are read from the disk and displayed. The process continues in a spiral pattern radiating outwardly from the FOA until the user changes the FOA or selects a different image from the deck of images. When the user makes a change either in the FOA or selected image, the spiraling process is interrupted and the process starts over with the new image block that contains the FOA.

By using the mouse and buttons on the mouse, the user can both browse through the images of the deck in sequence or move the FOA around in a selected image. As the user browses, either by moving the FOA in a given image or by moving to different images, the portions of the image that are centered at the FOA are displayed nearly instantaneously. Then when the user pauses to examine image detail more closely, the image portion that surrounds the FOA is displayed automatically in an ever increasing spiral. The spiraling pattern produces a blossoming effect as the new image pixels are updated on the screen. When the user moves the FOA or scrolls through the images in the deck very quickly, the spiral is small and tight and when the user pauses to examine the detail more closely or to obtain a broader view, the blossoming automatically becomes bigger.

DESCRIPTION OF A PREFERRED EMBODIMENT

Figure 2:
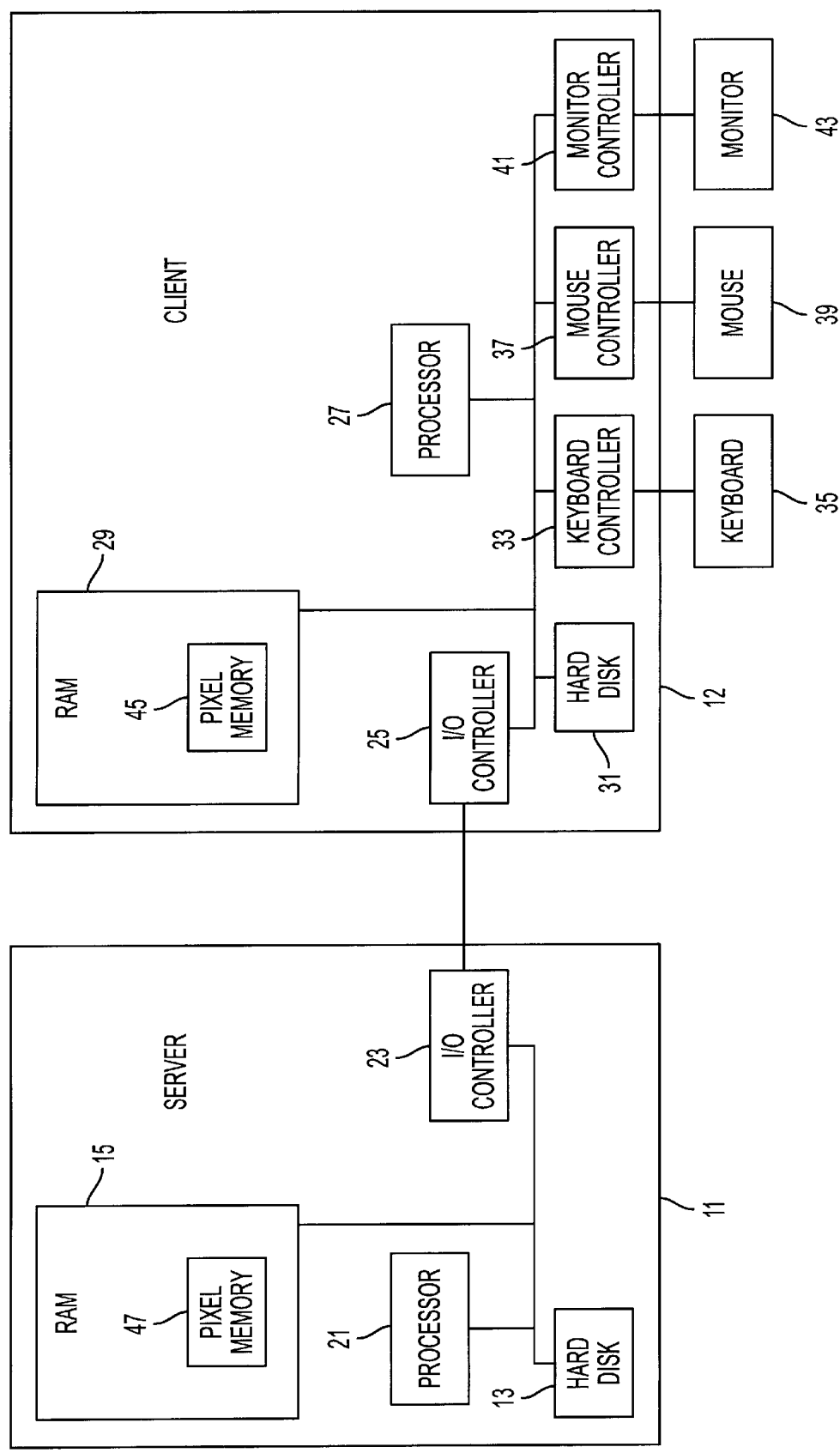
FIG. 2 is a block diagram illustrating the system of the invention.

As shown in FIG. 2, the system of the present invention in the preferred embodiment is implemented on a computer system comprising a server 11 and a client 12. Alternatively, the system could be implemented on a single PC. The server 11 has a hard disk 13 and a random access memory 15 (RAM) and a digital processor 21. A deck of related images is stored in the hard disk 13. The processor 21 controls the transfer of data between the hard disk 13 and the random access memory 15 and the transfer of data between server 11 and the client 12 via I/O controller 23. In the preferred embodiment, the deck of related images stored on the hard disk 13 is a hyperspectral image deck wherein each stored image is confined to a different narrow spectral band of a spectrum with the narrow bands distributed throughout the spectrum. The stored images are indexed on the hard disk in accordance with where they occur in the spectrum.

The image deck, instead of being stored on the hard disk, could also be stored on a CD ROM, a floppy disk, or any other comparable mass storage device to which the rate of access is slow relative to the rate of access to a RAM. Such mass storage devices are usually characterized by the fact that they contain moving parts whereas a RAM does not.

The client 12 is also a personal computer or work station and comprises a digital processor 27, an I/O controller 25 for communicating with the server 11, a RAM 29, a hard disk 31, a keyboard controller 33 connected to and controlling a keyboard 35, a mouse controller 37 connected to and controlling a mouse 39, and a monitor controller 41 connected to and controlling a monitor 43, which is a pixel display device in the form of a video display unit. The RAM 29 is mapped with a pixel memory 45 and the operating system of the client will display on the monitor 43 the image represented by the pixel values stored in the pixel memory 45.

Figure 1:
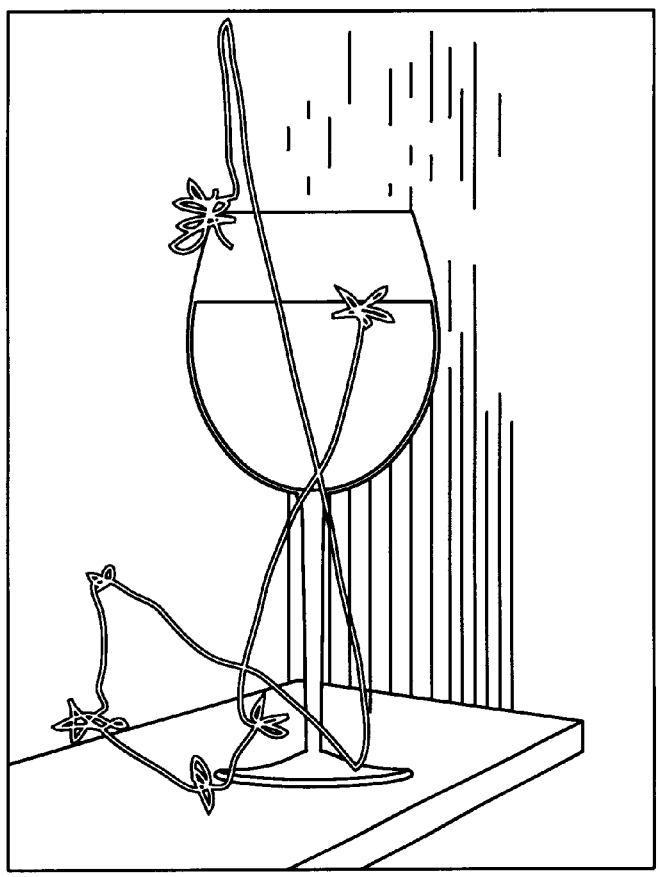
FIG. 1 illustrates the human perception principle of focus of attention as described above.
Figure 3:
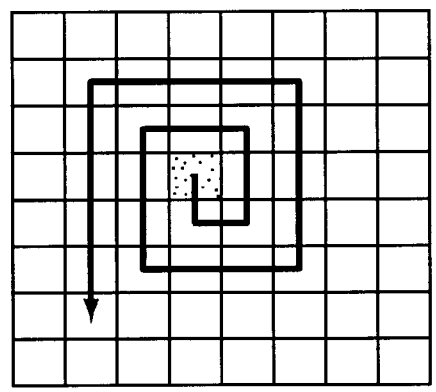
FIG. 3 graphically illustrates how the blocks are divided and how they are made visible in sequence when the viewer pauses at a given FOA in the browsing process.

As a preprocessing step of the present invention, the individual images of the image deck stored on the hard disk 13 of the server are divided into blocks as shown in FIG. 3 wherein each block will be a small square portion of the entire image. For example, each block may be a 25×25 pixel image segment and the image made up by an 8×8 set of blocks whereby the overall image would be a 200×200 pixel display. In addition to each image in the deck stored in the hard disk being divided into blocks, the pixels of each block are stored in block major order, that is, with the pixels of each block grouped together and stored sequentially. This grouping of pixels by block facilitates the reading out of all the pixels in a block and enables a readout of a block to be carried out more quickly.

After the deck of images has been organized on the hard disk 13 as described above, the system is ready to make use of the image accessing system of the present invention. As a first step in this process, the user at the client 12 will select one of the images in the deck stored in the hard disk 13 by means of the mouse 39 or by means of the keyboard 35 and also in addition selects by means of the mouse a focus of attention in the selected image. The user selects the FOA in the selected stored image by moving the mouse cursor to the position of the FOA on the monitor 43. At the start of the process, the monitor will display whatever is in the pixel memory 45. The display at the beginning of the process will typically be dark in response to the zero level pixel values being initially stored in each pixel location in the pixel memory 45. The selection of the FOA also selects the block containing the FOA (called the FOA block) and this block selection will be sent by the client 12 to the server 11. The processor 21 of the server 11, upon receiving the FOA block selection from the client, will read the FOA block out from the hard disk 13, will transmit the FOA block to the client 12 where the FOA block will be stored in the appropriate location in the pixel memory 45. As a result, the FOA block will be immediately displayed in its correct location by the pixel display device 43. If the user does not change the block selected as the FOA block or change the selected image, the program of the invention then proceeds to read out additional blocks from the selected image in the hard disk 13 successively proceeding in a spiral pattern as shown in FIG. 3. As each block is read out, it is transmitted to the client 15 and is stored in the pixel memory 45 so that these additional blocks will be displayed by the display device 29 and the displayed portion of the selected image will expand outwardly from the FOA block. This outward expansion of the displayed portion is referred to as blossoming. As soon as the user changes the FOA in the selected image or changes the selected image of the stored image deck, the program of the invention will read out the new FOA block from the hard disk 13 and store the new FOA block in the appropriate location in the pixel memory 45 to cause the newly selected FOA block to be displayed on the pixel display device 43. The blossoming will begin again around the new FOA block unless or until the blossoming is cut off by the user moving the FOA or changing the selected image, whereupon the spiral blossoming will begin anew from the newly selected FOA block.

To select a block as the FOA block in a selected image, the user moves the mouse cursor to the position on the screen corresponding to the FOA and clicks the left button on the mouse. If the user holds down the right button on the mouse and moves the mouse, an inputted index number is incremented sequentially higher or lower depending on which direction the mouse is moved. The images are assigned sequential index numbers and the inputted index number selects the image assigned with the corresponding number. Thus, the manipulation of the mouse, as described above, changes the selected image upwardly or downwardly in the deck. The index of the selected image is displayed on the screen next to the mouse cursor. While the selected image is being changed in this manner, the position of the FOA remains the same, but with each new image selected, a new FOA block will be selected because the corresponding block in each image is different. Thus, the selection of a new FOA by means of the left mouse button or the selection of a new image by means of the right mouse button will cause a new FOA block to be read out from the hard disk 13 of the server and stored in pixel memory 45 in the client 12 and start the spiral blossoming again from this new selected FOA in the selected image.

The pseudo, code listed below summarizes the operation of the process:

```
Loop
    Input FOA (from mouse)
    Input image index (from mouse)
    Loop over all blocks in image, starting from the FOA and spiraling outward
        Read current block from disk and display on screen
        If the user changes the FOA or image index, break out of inner loop
    End-Loop
End-Loop
```

The break statement in the inner loop of the pseudo code listed above can be implemented by means of interrupts, for example, "button motion" events in the X windows operating system, which typically would be employed in a server client computer system.

The image blocks which have been previously stored in pixel memory 45 in the process will remain in the pixel memory until being replaced by a new image block. Thus, when the user, moves the FOA around in a single selected image, the previously displayed image blocks from that selected image will further fill out the display of the selected image. When the user selects a new image in the deck by using his mouse as described above, the previously displayed blocks will not correctly fill out the newly selected image, but the visible boundaries between adjacent parts of the image will be commonly shown in most or all of the images. Accordingly, the continued display of blocks from prior selected images provide a frame of reference for the displayed portion surrounding the FOA in the newly selected image.

In a preferred embodiment of the invention, not every pixel value in each block read out from the hard disk 13 during the blossoming process is stored in pixel memory 45 and displayed. Instead, only those pixel values which represent a change in pixel intensity greater than a preselected threshold from the previously displayed corresponding pixel are initially stored in the pixel memory 45 and displayed. Accordingly, the displayed intensity at such a pixel will remain at the same level as in the previous display. The feature of not updating the pixel memory with the pixel values which represent little or no change in intensity is useful because successive images in hyperspectral image decks do not differ significantly. Only a small portion of the corresponding pixels change from image to image so that an image block can be closely approximated in the display thereof when only the pixel values representing significant changes are updated in the pixel memory. This technique is particularly useful in a server client computer system because there is a measurable delay in the time that an image block is read out from the hard disk in the server and the image block is loaded in the pixel memory of the client. This delay is due to the time required to send pixel values from the server to the client. By only sending pixel values which,have changed significantly, the delay is minimized.

To implement this feature, the server compares the pixel values in each image block read out from the hard disk 13 with a copy of the corresponding pixel values which are stored in the pixel memory 45. The RAM 15 of the server 11 is also mapped with the pixel memory 47 which stores a copy of the pixel values stored in the pixel memory 45. The pixel memory 47 in the RAM 15 is updated each time a new block of pixel values is sent by the server to the client to be stored in the pixel memory 45. When a new image block is read out from the hard disk 13 to be sent to the client 12 and stored in the pixel memory 45, the pixels of the image block are compared with the pixel in the copy of the corresponding image block in the pixel memory 47 of the RAM 15. If a new pixel value differs from the previous corresponding pixel value stored in the pixel memory 47 by less than the preselected threshold, then the new pixel value is not transmitted and the new pixel value is not used to update either the pixel memory 47 or the pixel memory 45. When a pixel value in a newly read out block differs from the corresponding pixel value stored in the pixel memory 47 by more than the threshold value, then this new pixel value is transmitted to the client and stored in the appropriate location in the pixel memory 45. In addition, the new pixel value updates the pixel memory 47. By transmitting only the pixel values which have changed by an amount greater than the preselected threshold, the delay in the display of the newly readout image blocks is minimized. Later, if the user lingers at the FOA for a long enough time for the blossoming to encompass the entire selected image, the minimally changed pixel values which were not transmitted will be transmitted to the client to update the pixel memory with pixel values which represent changes of less than the threshold value. These pixel values, which are changed less than the threshold value, update the pixel memory 45 in the same spiral process blossoming expansions pattern as when the FOA is first selected. Thus, when a user selects a new FOA and then lingers at the FOA, the display will first blossom from the FOA in a spiral pattern wherein only those pixel values in the pixel memory which have changes greater than the preselected threshold values are updated and then this process is followed by a second blossoming in which the remaining minimally changed pixel values are updated.

Another feature of the preferred embodiment is called anticipatory loading. When the user lingers at a focus of attention for a long period of time, the system of the invention assumes that the user will remain even longer at this FOA. After a period of time, such as after the blossoming has expanded through the entire image twice, the first time for the highly changed pixel values and then the second time for the minimally changed pixel values, the program begins to load into the RAM 29 blocks in the non-selected images that contain the FOA position. Since these blocks are not being loaded for current display, they are not loaded in the pixel memory 45 This loading of blocks from non-selected images will proceed by loading first the image blocks from stored images which are closest to the selected stored image and then proceeding progressively away from the selected stored image. The program will then begin to load into the RAM 29 the other image blocks which are near to the FOA position until the memory of the RAM 29 is exhausted. Then when the user begins to browse through the deck of images at the same FOA position, the new FOA blocks in the newly selected images, and the adjacent image blocks, if loaded into the RAM 29, will be displayed much more quickly because these image blocks will already be in the RAM 29 and do not need to be loaded from the hard disk 13.

The loading of the image blocks from the non-selected images in the deck could be interleaved with the reading out of the image blocks in the selected image during the blossoming process, instead of waiting until the blossoming has expanded through the entire image. Alternatively, the blocks in the non-selected images could be interleaved with the second blossoming cycle wherein the minimally changed pixel values are loaded in the pixel memory 45.

When the system is implemented in a PC computer, instead of a server client computer system, the hyperspectral image deck will be stored in the hard disk or equivalent storage device of the PC and the process will be carried out in the same manner as described above in connection with the client server system, except that the program will read the image blocks from the hard disk of the PC rather than from the hard disk of a server connected to the PC by a network connection.

As described above, the present invention is employed in a computer system in which the mouse has a left and right button. The system of the invention can also be implemented in a system employing a mouse which only has a single button. In this implementation, a mouse click wherein the mouse button is pressed and released selects the FOA at the position of the mouse cursor. To select a different image in the deck, the user holds down the button and drags the mouse left or right to move upwardly or downwardly through the deck and picks up the mouse when the desired image in the deck is reached. As the user performs the action of selecting a new image in the deck, the current index number of the image in the image deck is displayed next to the mouse curser.

The image in the deck is selected by the inputted index number and the inputted index number is changed by the drag and pick up action of the mouse. For example, if the previous position of the mouse was XPREV, YPREV, and the mouse is dragged with the button down to the XY position, then the value X-XPREV is added to the inputted index number which will then cause the image assigned to that index number to be selected.

In the above description, the image blocks are rectangular in shape, but obviously the image blocks may take any convenient shape as long as the image blocks can be assembled to consist of the entire image. These and other modifications may be made to the above-described disclosure without departing from the spirit and scope of the invention which is defined in the appended claims.

What is claimed is:

1. A method of browsing images in a deck of related images stored in pixel form, comprising a viewer selecting a plurality of foci of attention in selected images of said deck in sequence; reading out from storage and displaying to said viewer image blocks containing said foci of attention as each focus of attention is selected whereby said blocks are read out and displayed sequentially; at least some of the foci of attention being selected by said viewer while the image blocks containing such foci of attention are not displayed to said viewer; after reading and displaying each image block containing a focus of attention, if the next focus of attention has not yet been selected, reading out and displaying a portion of the currently selected image surrounding the image block containing the focus of attention; and expanding the displayed portion of the selected image around the current focus of attention until the next focus of attention in said sequence is selected.

2. A method as recited in claim 1, wherein the portion of the selected image surrounding the currently selected focus of attention is expanded in a spiral pattern.

3. A method as recited in claim 1, wherein each of said images is divided into image blocks and where the displayed portion of a selected image is expanded by reading out the image blocks of a selected image in a spiral pattern around the image block containing the focus of attention.

4. A method as recited in claim 1, wherein said deck is stored in a mass storage device and wherein the image blocks and image portions that are read out from said mass storage device are stored in a random access memory.

5. A method as recited in claim 4, wherein said mass storage device is a hard disk.

6. A method as recited in claim 1, wherein an image block containing a focus of attention is selected to be read out from storage by selecting one of the images in said deck, selecting the focus of attention, and reading out the image block in the selected image containing the focus of attention.

7. A method as recited claim 1, wherein the focus of attention is selected by manipulating a mouse.

8. A method as recited in claim 1, wherein an image in said deck is selected and the focus of attention is selected by manipulating a mouse.

9. A method as recited in claim 1, wherein said images in said deck are assigned index numbers and wherein the image currently selected has an assigned index number corresponding to a current inputted index number.

10. A method as recited in claim 9, wherein the selected image is changed to a new image in said deck by changing the inputted index number.

11. A method as recited in claim 1, wherein said image deck is a deck of hyperspectral image.

12. A method as recited in claim 1 wherein some of the selected foci of attention in said sequence are in different images.

13. A method as recited in claim 12 wherein the previously displayed image is continued to be displayed when a new focus of attention is selected in a different image of said deck until being replaced in the displayed image by the process of displaying the block of the new selected focus of attention and expanding the displayed portion of the selected image around the current focus of attention.

14. A method of browsing images in a deck of related images stored in pixel form, comprising selecting a plurality of foci of attention in selected images of said deck in sequence; reading out from storage and displaying image blocks containing said foci of attention as each focus of attention is selected whereby said blocks are read out and displayed sequentially; after reading and displaying each image block containing a focus of attention, if the next focus of attention has not yet been selected, reading out and displaying a portion of the currently selected image surrounding the image block containing the focus of attention; and expanding the displayed portion of the selected image around the current focus of attention until the next focus of attention in said sequence is selected, wherein the pixel values read out from storage for display are compared with the corresponding pixel values previously displayed to determine whether each read-out pixel value is changed by an amount greater than a predetermined threshold and wherein only pixel values which represent change in value greater than said predetermined threshold are displayed upon being read out from storage.

15. A method of browsing images in a deck of related images stored in pixel form, comprising selecting a plurality of foci of attention in selected images of said deck in sequence; reading out from storage and displaying image blocks containing said foci of attention as each focus of attention is selected whereby said blocks are read out and displayed sequentially; after reading and displaying each image block containing a focus of attention, if the next focus of attention has not yet been selected, reading out and displaying a portion of the currently selected image surrounding the image block containing the focus of attention; and expanding the displayed portion of the selected image around the current focus of attention until the next focus of attention in said sequence is selected, wherein said image deck is stored in a mass storage device, wherein pixel values are read out from said mass storage device and stored in a pixel memory comprising a random access memory, wherein said pixel values stored in said pixel memory are displayed, and wherein image blocks containing the focus of attention position in non-selected images are read out and stored in a random access memory outside of said pixel memory when the focus of attention remains in the same position for a predetermined period of time.

16. An image browsing system comprising a mass storage device for storing an image deck containing a multiplicity of images in pixel form, a pixel memory for storing pixel values representing images in said image deck, a pixel display device displaying the image or image portion represented by the pixel values stored in said pixel memory, and processing means permitting a plurality of foci of attention in selected images of said deck to be selected in sequence and reading out from said mass storage device image blocks containing said foci of attention as each focus of attention is selected and storing the image blocks read out in said pixel memory wherein said blocks are read out and displayed sequentially, said processing means permitting selection of the foci of attention of said sequence by a viewer of said display device while the image blocks containing such foci are not stored in said pixel memory and are not displayed to said viewer on said display device, said processing means after reading out and displaying each image block containing a focus of attention, if the next focus of attention has not yet been selected, reading out and displaying a portion of the currently selected image around the image block containing the focus of attention, and expandingly displayed portion of the selected image around the current focus of attention until the next focus of attention in said sequence is selected.

17. A method as recited are claim 16, wherein the portion of the selected image surrounding the currently selected focus of attention is expanded in a spiral pattern.

18. A system as recited in claim 16, wherein said images are divided into blocks and wherein said processing means expands a displayed portion of a selected image around a focus of attention by reading out said blocks in a spiral pattern around the block containing the currently selected focus of attention.

19. A system as recited in claim 16, further comprising a mouse, said processing means responding to the manipulation of said mouse to select the focus of attention.

20. A system as recited in claim 16, further comprising a mouse, said processing means responding to the manipulation of said mouse to select an image and to select a focus of attention.

21. A system as recited in claim 16, wherein said system comprises a server client system comprising a client interconnected to a server, and wherein said mass storage device is in said server and said pixel memory is in said client.

22. An image browsing system as recited in claim 16 wherein some of the foci of attention in said sequence permitted to be selected are in different images in said deck.

23. An image browsing system as recited in claim 16 wherein said processing means continues to display the previously displayed image when a new focus of attention is selected in a different image of said deck until being replaced in the displayed image by the process of displaying the block containing the currently selected focus of attention and expanding the displayed image around the currently selected focus of attention.

24. An image browsing system comprising a mass storage device for storing an image deck containing a multiplicity of images in pixel form, a pixel memory for storing pixel values representing images in said image deck, a pixel display device displaying the image or image portion represented by the pixel values stored in said pixel memory, and processing means permitting a plurality of foci of attention in selected images of said deck to be selected in sequence and reading out from said mass storage device image blocks containing said foci of attention as each focus of attention is selected and storing the image blocks read out in said pixel memory wherein said blocks are read out and displayed sequentially, said processing means after reading out and displaying each image block containing a focus of attention, if the next focus of attention has not yet been selected, reading out and displaying a portion of the currently selected image around the image block containing the focus of attention, and expandingly displayed portion of the selected image around the current focus of attention until the next focus of attention in said sequence is selected, wherein said processing means compares the pixel values of the pixels read out from said mass storage device with the corresponding previously displayed pixel value and initially displays only those pixel values read out from said mass storage device which change from the previously displayed pixel values by more than a predetermined threshold.

* * * * *